United States Patent [19]
Komiya et al.

[11] Patent Number: 5,927,746
[45] Date of Patent: Jul. 27, 1999

[54] STEERING WHEEL

[75] Inventors: Fuminori Komiya; Sakashi Hattori; Keizo Suzuki, all of Aichi-ken, Japan

[73] Assignee: Kabushiki Kaisha Tokai-Rika-Denki-Seisakusho, Aichi-ken, Japan

[21] Appl. No.: 08/854,190

[22] Filed: May 9, 1997

[30] Foreign Application Priority Data

May 9, 1996 [JP] Japan .................................. 8-115111

[51] Int. Cl.$^6$ .................................................. B60R 21/16
[52] U.S. Cl. .................... 280/728.2; 280/731; 200/61.55
[58] Field of Search .............................. 280/728.2, 728.3, 280/731; 200/61.54, 61.55; 74/484.14

[56] References Cited

U.S. PATENT DOCUMENTS 5,303,952  4/1994  Shermetaro et al. .................... 280/731

FOREIGN PATENT DOCUMENTS

0 744 329 A1  6/1995  European Pat. Off. .
2270883       3/1994  United Kingdom .

Primary Examiner—Paul N. Dickson
Attorney, Agent, or Firm—Arnold, White & Durkee

[57] ABSTRACT

A steering wheel which strengthens and simplifies a structure supporting a pad, to which an air bag apparatus is attached, at a cored bar. A cored bar is integrally formed with a bridge (engaging piece) formed by leg portions, which stand upright from spokes or the like, and a crossbar (pressing portion), which is bent and formed from the leg portions. A bracket for a pad, to which an air bag apparatus is attached, is mounted at the space between the boss portion of the cored bar and the crossbar. When the air bag apparatus is operated, impact force applied in a vehicle operator's direction is supported by the bridge (engaging piece) via the bracket.

12 Claims, 10 Drawing Sheets

STEERING WHEEL

BACKGROUND OF THE INVENTION

1. Field of the Invention

The present invention relates to a steering wheel in which a pad, to which an air bag apparatus is attached and which is an operating member for a horn switch, is attached to a supporting structure of a cored bar.

2. Description of the Related Art

Figure 10:
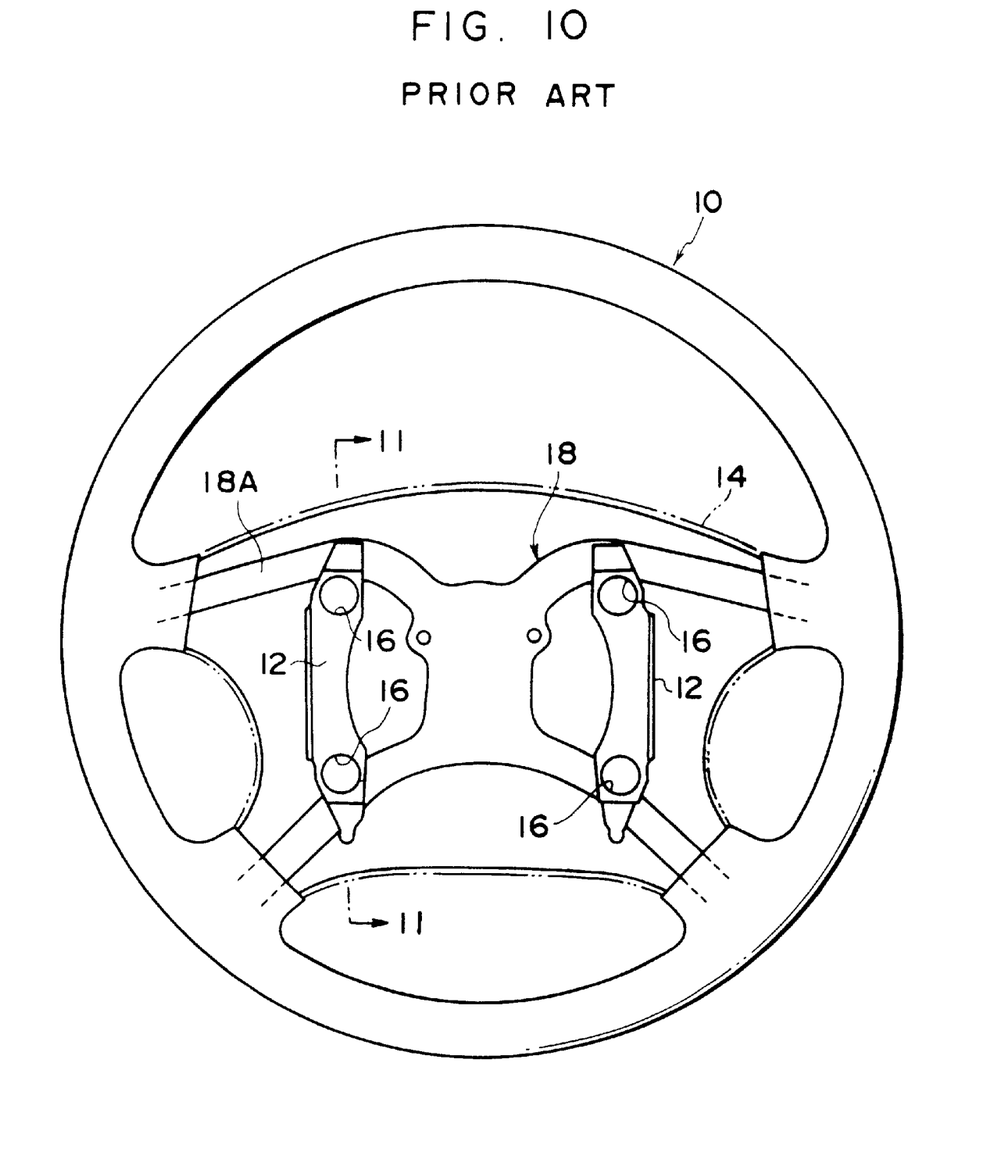
FIG. 10 is an elevational view of a steering wheel relating to a conventional example in a state in which a pad is removed therefrom.
Figure 11:
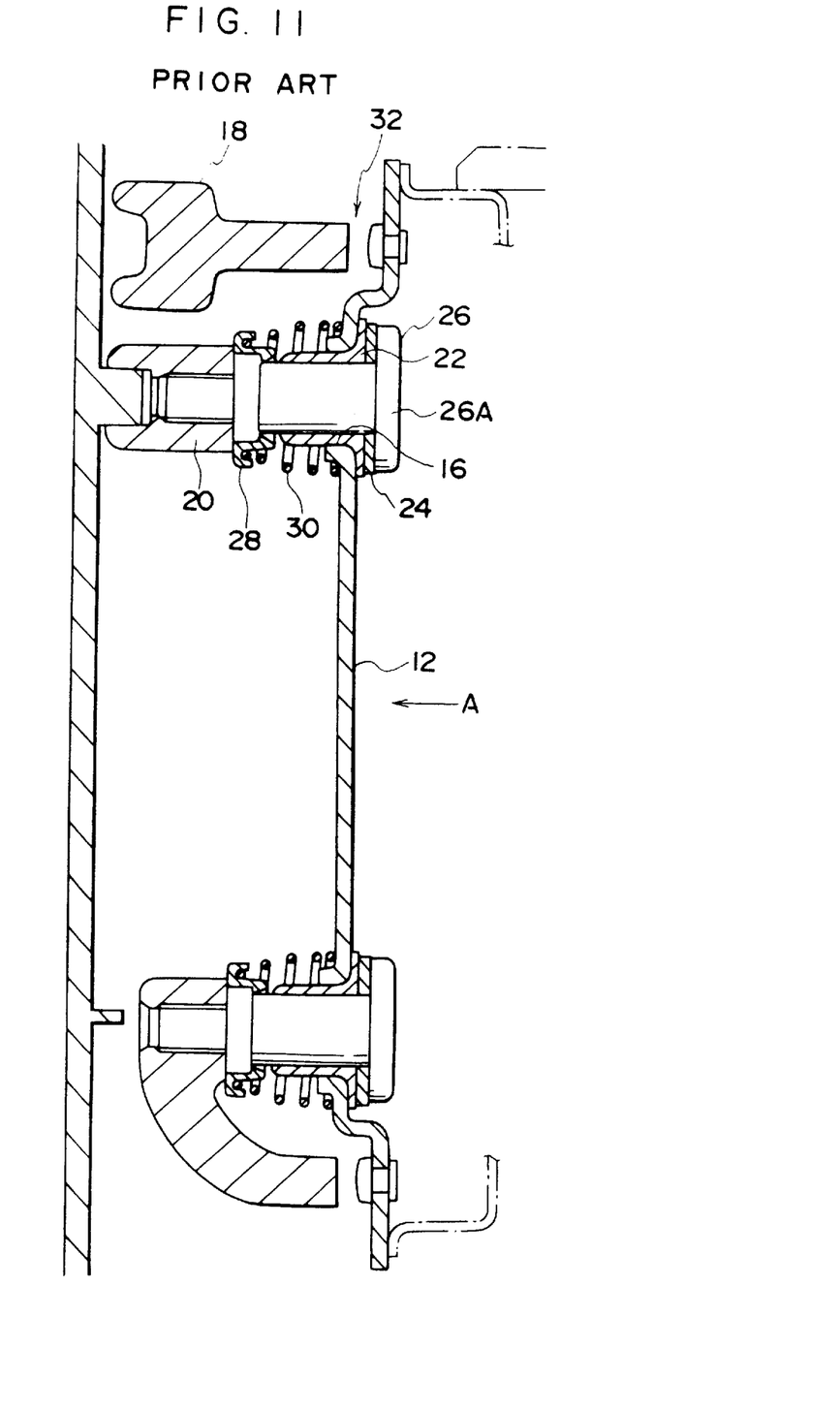
FIG. 11 is an enlarged cross-sectional view taken along line 11—11 of FIG. 10.

FIGS. 10 and 11 show a general mounting structure of a steering wheel in a case in which a pad, to which an air bag apparatus is attached and which serves as an operating member for a horn switch, is provided at the central portion of a four-spoke type steering wheel. FIG. 10 is an elevational view of a steering wheel 10 in a state in which a pad is removed therefrom (shown by an imaginary line), and FIG. 11 is a cross-sectional view taken along line 11—11 of FIG. 10.

Brackets 12 are attached to the steering wheel 10, and a pad 14 shown by the imaginary line in FIG. 10 is attached to the brackets 12.

An air bag apparatus, not shown, is attached to the pad 14. The air bag apparatus is structured such that gas of an inflator operated by an acceleration sensor is rapidly injected into a folded bag body and expands the bag body. The frame body of the air bag apparatus is engaged with the brackets 12 by using screws or the like. The air bag apparatus is attached so that compressive and tensile load at the time of the unfolding of the air bag apparatus is supported by the cored bar 18 of the steering wheel 10 via the brackets 12

As illustrated in FIG. 10, when seen from the front of the steering wheel 10, the brackets 12 are substantially longitudinal plate-shaped members and are disposed left and right with the center of the steering wheel 10 therebetween. Further, through-holes 16 are formed at the free end portions of the bracket 12.

On the other hand, as illustrated in FIG. 11, at the cored bar 18 of the steering wheel 10, bosses 20 formed with a screw hole are disposed at four positions corresponding to the through-holes 16 of the bracket 12. A bolt 26, into which a bushing 22 and a washer 24 are incorporated, is inserted through the through-hole 16 of the bracket 12. Moreover, after a spring receiving member 28 and a compression coil spring 30 are temporarily assembled, the bolt 26 is clamped to the screw hole of the boss 20 such that the bracket 12 is attached to the cored bar 18.

At this time, the bracket 12 for the pad is urged by the spring 30 and abuts the reverse surface of a head 26A of the bolt 26. When the pad 14 is pressed, the bracket 12 can be displaced in the direction of the cored bar 18 while compressing the spring 30. A contact 32 of a horn switch is provided between the cored bar 18 and the bracket 12 for the pad. When the pad 14 is pressed, the horn sounds.

In a conventional steering wheel which is structured as described above, when the air bag apparatus operates and the bag body is rapidly expanded by the gas injected from the inflator, from the air bag apparatus to the steering wheel 10, at first a large impact load is applied in the direction opposite the vehicle operator's direction, i.e., the direction of arrow A in FIG. 11 and, at the next moment, a large impact load is applied in the direction opposite the direction of arrow A. Namely, besides the large bending load applied to the bracket 12 which supports the air bag apparatus in the direction of arrow A and the direction opposite the direction of arrow A, a large compressive and tensile load is applied to the members such as the bolt 26 and the boss 20 which engage the bracket 12 with the cored bar 18.

In order to be able to resist the large load, the size or thickness of each of the members such as the cored bar 18, the bracket 12, the bolt 26, and the boss 20 is increased so as to enhance the strength of each of the members. Therefore, a drawback arises in that the members become large, heavy, and expensive.

SUMMARY OF THE INVENTION

With the aforementioned in view, a purpose of the present invention is to provide a new simplified steering wheel which improves the structure of supporting a pad, to which an air bag apparatus is attached, by a cored bar.

The steering wheel according to the present invention is a steering wheel of a center horn type in which a horn is sounded by operating a pad to which an air bag apparatus is attached, comprising: a steering wheel cored bar which includes a boss which is fixed to a steering shaft, spokes which extend from the boss, an annular wheel rim which is connected to end portions of the spokes, leg portions which stand at predetermined positions of one of the boss and the spokes, and a pressing portion which extends from the leg portions in the direction different from the directions of the leg portions; and a bracket which is connected to the pad to which the air bag apparatus is attached, the bracket being movably disposed between the boss or the spokes and the pressing portion of the steering wheel cored bar, the bracket being disposed so that, when the air bag apparatus of the pad is operated, impact force which is applied in the vehicle operator's direction is supported as the bracket abuts the pressing portion.

In the present invention, because the pad is connected to the movable bracket, the pad is movable. As a result, the horn can be sounded by operating the pad. Further, when the air bag apparatus attached to the pad is operated, the impact force which is applied from the pad portion to the boss side is supported by the boss and the spoke portions of the cored bar via a member such as the bracket or the like. On the other hand, the impact force which is applied from the pad portion in the vehicle operator's direction is supported stably and reliably as the bracket abuts the pressing portion which extends from leg portions stood at the predetermined positions of boss or spokes in the direction different from the directions of leg portions.

In this case, when the steering wheel cored bar includes a plurality of leg portions and the leg portions are connected by the pressing portion, the impact force which is applied from the pad portion to the boss side is supported by the boss and the spoke portions of the cored bar via a member such as the bracket. On the other hand, the impact force which is applied from the pad portion in the vehicle operator's direction is supported as the bracket abuts the pressing portion in a state in which the leg portions are connected. Accordingly, the impact force is more stably and reliably supported.

Moreover, if the steering wheel cored bar is a die-cast product, the leg portions and the pressing portion can be cast integrally. Therefore, production of the steering wheel becomes easy and an inexpensive product can be provided.

DESCRIPTION OF THE PREFERRED EMBODIMENTS

FIGS. 1 to 9 illustrate a steering wheel relating to an embodiment of the present invention to which a pad equipped with an air bag apparatus is attached.

Figure 1:
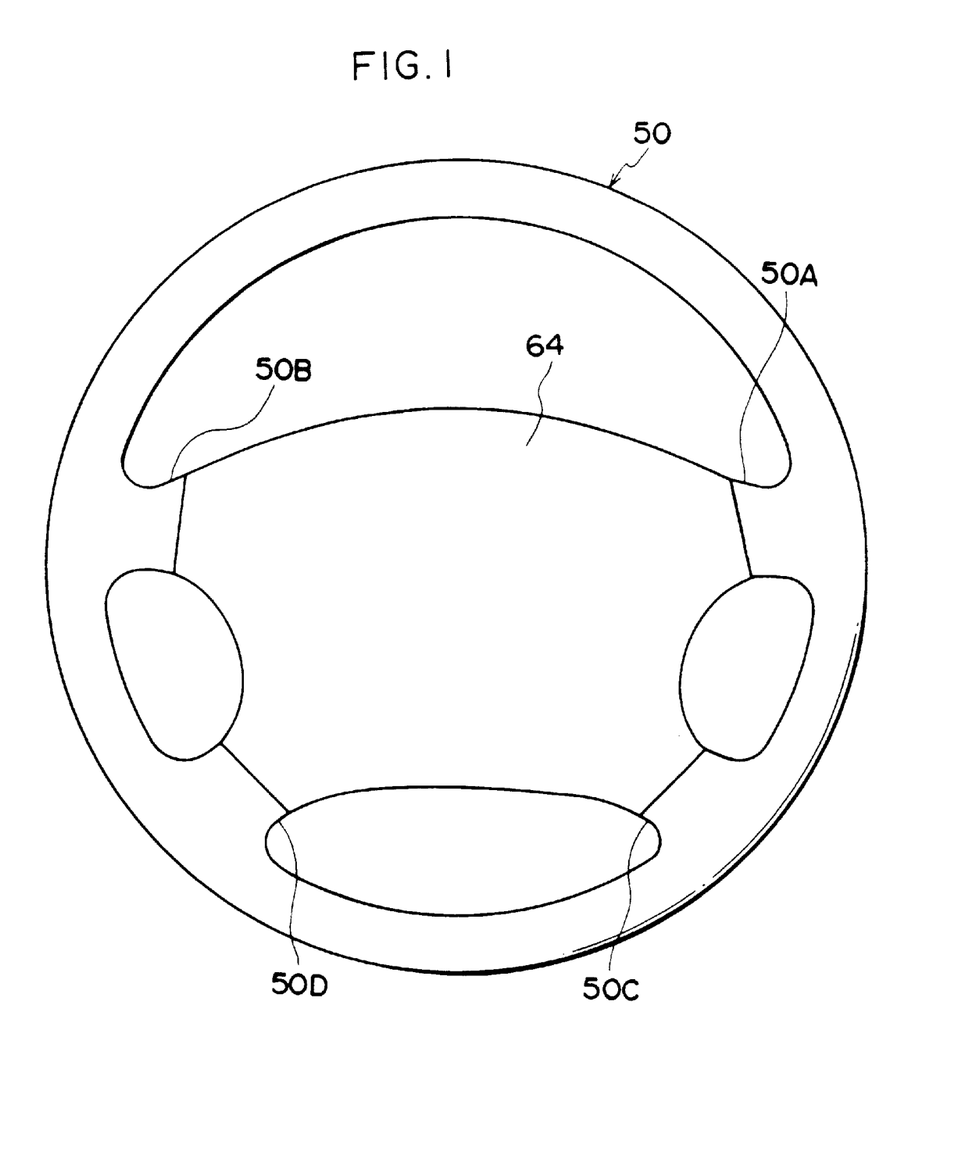
FIG. 1 is an elevational view which shows a steering wheel relating to an embodiment of the present invention.

As illustrated in the elevational view of FIG. 1, the steering wheel 50 is a four-spoke type steering wheel which includes spokes 50A, 50B, 50C and 50D extending from the center of the steering wheel 50 in a radial direction. The steering wheel 50 includes a pad 64 for a horn switch equipped with an integrated air bag apparatus which covers the portion from the central portion of the steering wheel 50 to the midway portions of the spokes 50A to SOD.

Figure 2:
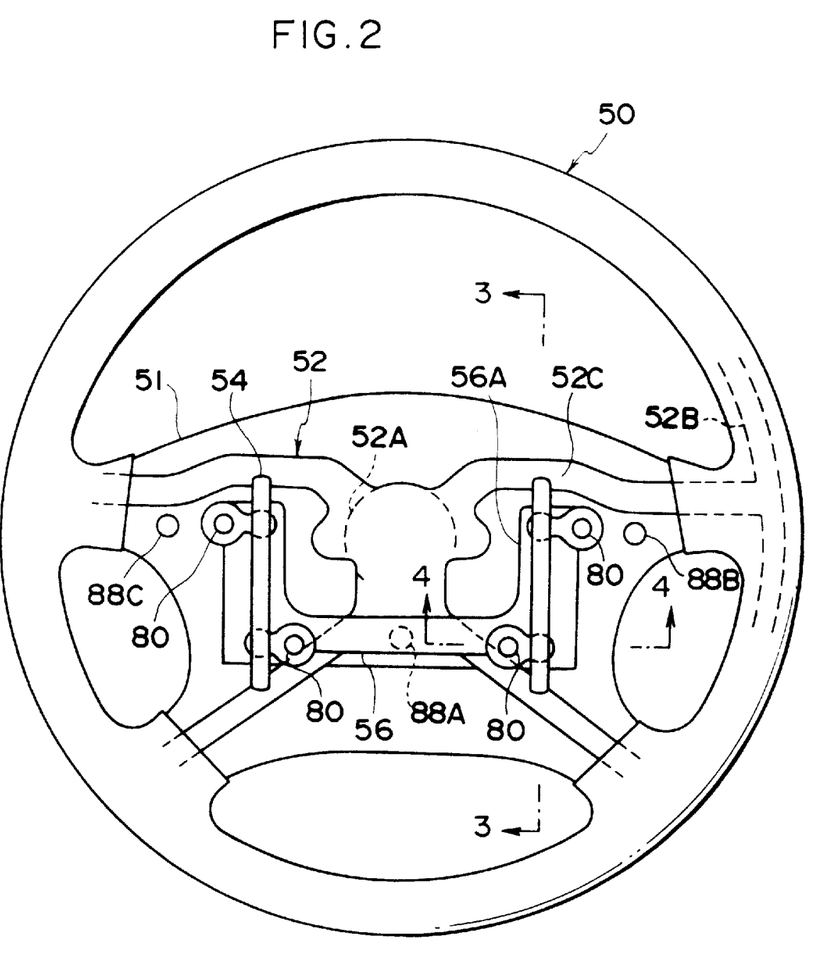
FIG. 2 is a schematic elevational view which shows the steering wheel relating to the embodiment of the present invention in a state in which a pad is removed therefrom.
Figure 3:
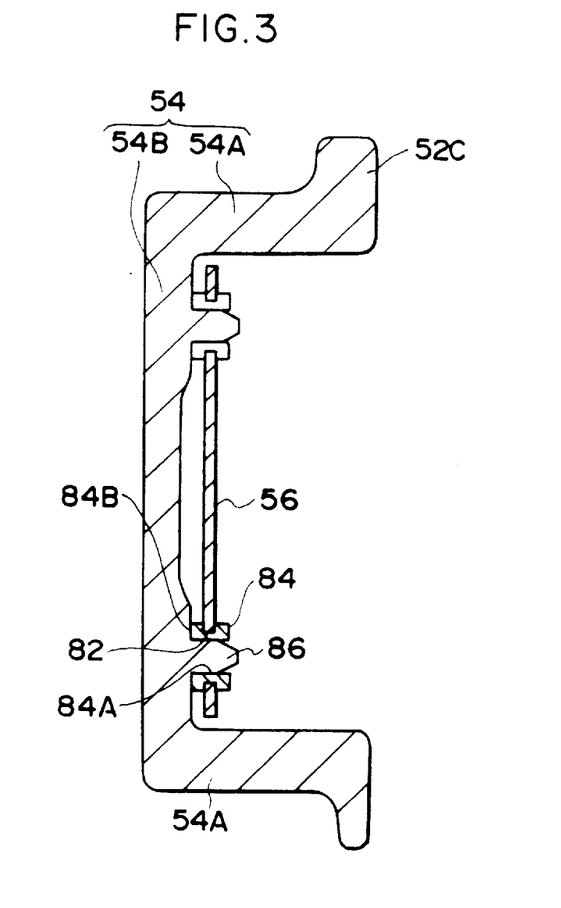
FIG. 3 is an enlarged cross-sectional view taken along line 3—3 of FIG. 2.
Figure 4:
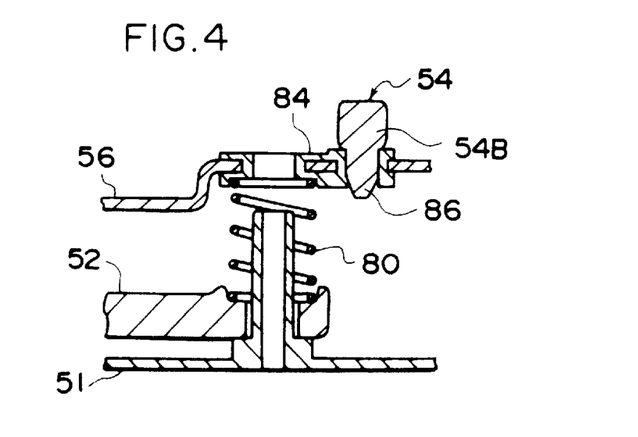
FIG. 4 is an enlarged cross-sectional view taken along line 4—4 of FIG. 2.
Figure 5:
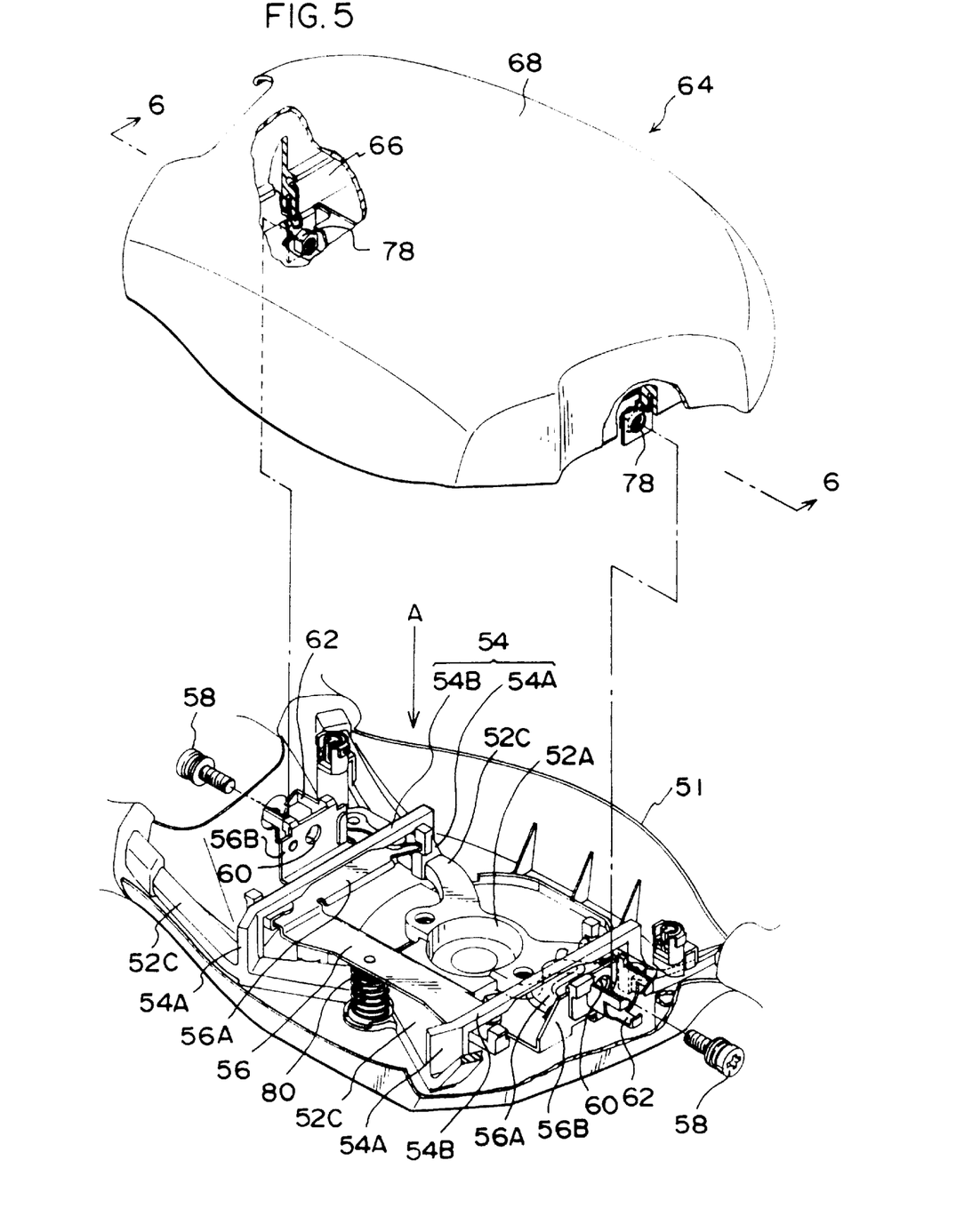
FIG. 5 is an exploded perspective view which shows a principal part of the steering wheel relating to the embodiment of the present invention.

FIG. 2 is a schematic elevational view of the steering wheel 50 in a state in which the pad 64 is removed therefrom. FIG. 3 is an enlarged cross-sectional view taken along line 3—3 of FIG. 2. FIG. 4 is an enlarged cross-sectional view taken along line 4—4 of FIG. 2. FIG. 5 is an exploded perspective view of an essential part of the steering wheel. The steering wheel 50 includes a cored bar 52. The cored bar 52 comprises a central boss 52A for attaching the steering wheel 50 to a steering shaft (not shown), a wheel rim 52B which is positioned substantially concentrically with the boss 52A, and four spokes 52C which connect the boss 52A and the rim 52B. Two symmetrical bridges (engaging pieces) 54 are provided integrally with the spokes 52C of the cored bar 52. Each of the entire bridges 54 is integrally formed in a substantially inverted U-shape and includes two leg portions 54A, which are stood upright from the spokes 52C, and a crossbar (pressing portion) 54B, which connects the portion between the two leg portions 54A. The reverse surface side of the cored bar 52 is covered by a backing cover 51.

An intermediate portion of the crossbar 54B is partially formed to be thin. In the present embodiment, the cored bar 52 is integrally cast with the bridge 54 in accordance with a die casting method.

A bracket 56 for the pad is mounted at a space between the boss 52A or the spokes 52C of the cored bar 52 and the crossbar 54B. As illustrated in FIGS. 2 and 5, the entire bracket 56 is integrally formed in a substantially planar U-shape, and the respective edge portions 56A which extend parallel to each other from the free ends of the bracket 56 are disposed beneath the respective bridges 54. As a supporting portion for connecting the pad 64 to the bracket 56, a supporting plate portion 56B, which is bent in a right angle and stood upright from the outer end of the edge portion 56A, is integrally provided therewith.

A through-hole 60 for the screw shaft portion of a bolt 58 is punched at each of the supporting plate portions 56B. Further, a holder 62 which temporarily holds the bolt 58 is mounted at the portion near the through-hole 60.

Before the pad 64 is attached, the bolt 58 is supported by the holder 62, and the free end portion of the screw shaft of the bolt 58 is held so as to face the through-hole 60.

The bracket 56 is structured so that the portion thereof which is overlapped by the crossbar 54B serves as a surface abutting the crossbar 54B. Moreover, compression coil springs 80, which serve as means for urging the pad 64 toward the vehicle operator's side, are disposed at four positions between the bracket 56 and the spokes 52C of the cored bar 52. Instead of the compression coil springs 80, elastic members such as plate springs, rubber, or the like may be used. When plate springs are used, it is preferable that the plate springs be previously set to the bracket 56.

On the other hand, a through-hole 82, which is parallel to a steering shaft, not shown, is formed at the position of the abutting surface of the bracket 56, and a bushing 84, which is integrally formed with the bracket 56, is mounted at the through-hole 82 of the bracket 56. A hole 84A is formed at the bushing 84, and a pin 86, which is inserted through the hole 84A and guides the bracket 56, is formed at the lower surface of the crossbar 54B of the bridge 54. The bracket 56 is positioned at the center of the steering wheel 50 by the hole 84A and the pin 86. The front surface 84B of the bushing 84 is structured as the above-described abutting surface.

Figure 6:
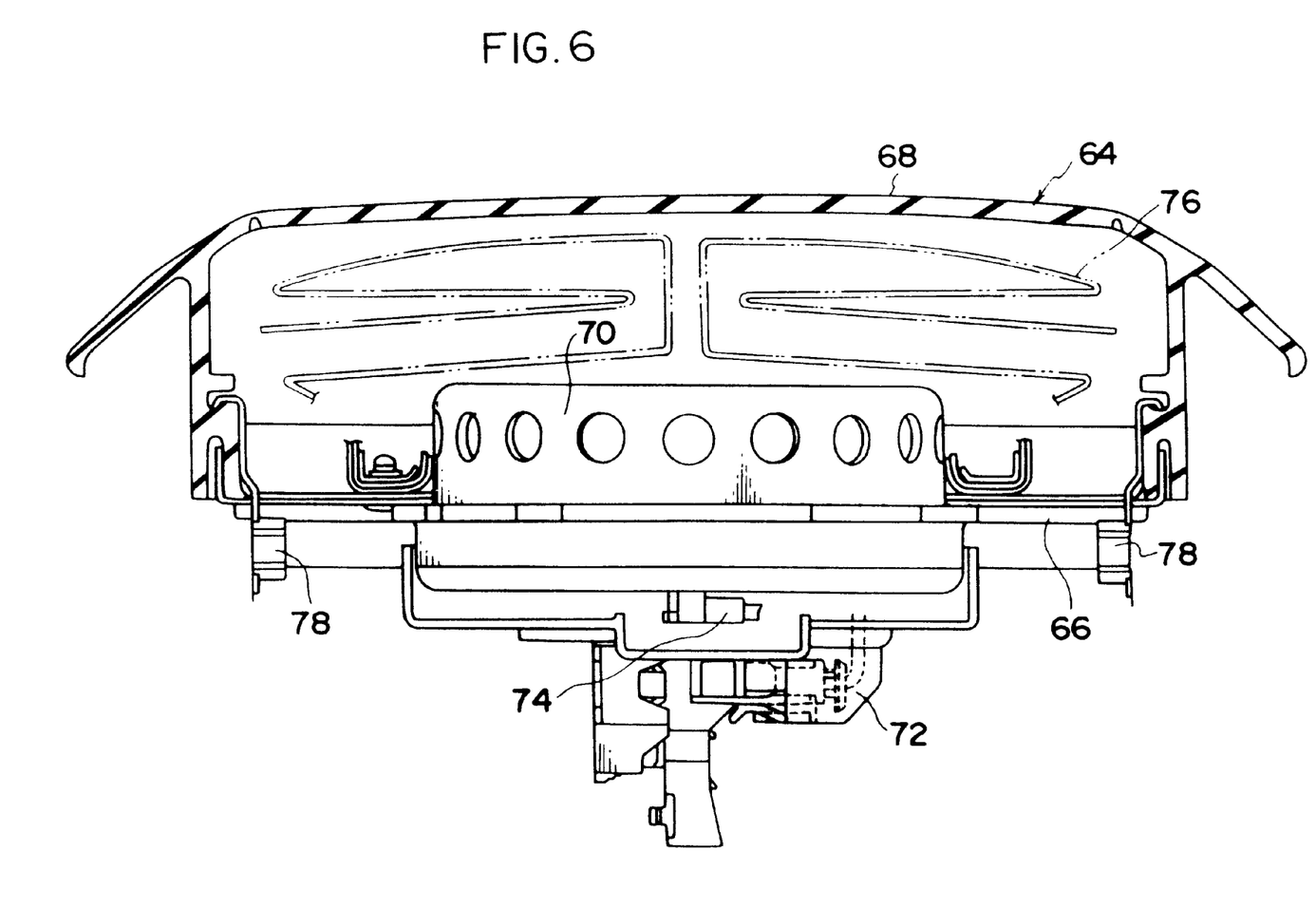
FIG. 6 is a cross-sectional view taken along line 6—6 of FIG. 5.

In the pad 64 shown in FIGS. 5 and 6, the air bag apparatus is attached to a frame body 66, and a surface cover member 68 is attached to the frame body 66 so as to cover the air bag apparatus. The air bag apparatus includes an inflator 70 which is fixed to the frame body 66, a connector 72 which is attached to the inflator 70, an ignition device 74 which is attached to the inflator 70, and a bag body 76 which is folded and accommodated within the space between the inflator 70 and the surface cover member 68.

A nut 78 is respectively provided at a predetermined position in the frame body 66 which corresponds to each of the supporting plate portions 56B of the bracket 56. As illustrated in FIG. 5, the pad 64 is loaded on the bracket 56. As each of the bolts 58 is strongly pressed, is removed from the holder 62, and is inserted through the nut 78, the holder 62 and the frame body 66 are integrally engaged by the bolt 58 and the nut 78.

A horn switch contact 88A is disposed at a position at a central portion of the pad 64 on the lower edge side thereof, a horn switch contact 88B is disposed at a position at a right portion of the pad 64 on the upper edge side thereof, and a horn switch contact 88C is disposed at a position at a left portion of the pad 64 on the upper edge side thereof. Details of the horn switch contacts 88A to 88C are omitted. However, similar to a conventional horn switch contact, the horn switch contacts 88A to 88C are formed by a fixed contact which is fixed to the cored bar 52 of the steering wheel 50 and a moving contact which is fixed to the pad, which is movable against the fixed contact and which is usually away from the fixed contact. A horn circuit is formed as the pad 64, which has been urged toward the vehicle operator's side by the compression coil springs 80, is pressed against the urging force thereof and by contacting the movable contact with the fixed contact.

In the steering wheel 50 structured as described above, because the bracket 56 for the pad is usually urged by the compression coil springs 80, the front surface 84B of the bushing 84 is held at the position abutting the crossbar 54B of the bridge 54. When the pad 64 is pressed, the bracket 56 is displaced while the springs 80 bend. Thus, at least one of the contacts 88A to 88C is turned on. In this way, according to the above structure, since the bracket 56 is operated in the same way as the case in which the bracket 56 is mounted at the cored bar by using the bolts, the operation of the horn switch can be effected as the conventional one.

Namely, by providing a contact which is turned off at the usual position of the pad urged toward the vehicle operator's side and is turned on at the position in which the pad is pressed, a horn can be sounded as occasion demands.

In the steering wheel 50, an output from an acceleration sensor, not shown, is sent to the ignition device 74 through the connector 72 so as to ignite the inflator 70. The gas generated by the inflator 70 is injected into the bag body 76 such that the surface cover member 68 is broken away and the bag body 76 is rapidly inflated. The air bag apparatus is thereby operated.

When the air bag apparatus is operated and the bag body 76 is inflated by the gas injected from the inflator 70, the load is supported by the cored bar 52 via the member such as the bracket 56. Namely, when the air bag apparatus is operated, at first, the impact force in the direction of arrow A in FIG. 5 is generated so as to press the pad 64 equipped with the air bag apparatus toward the boss 52A side of the cored bar 52, and at the next moment, the impact force in the direction opposite the direction of arrow A is generated so as to pull the pad 64 equipped therewith toward the vehicle operator's side.

The impact force applied in the direction of arrow A with respect to the cored bar 52 is stably and reliably supported by the area from the frame body 66 of the pad 64 to the boss 52A and the spokes 52C of the cored bar 52 via a member such as the bracket 56. Thus, there is no need to particularly thicken and strengthen the structure of the bracket 56 or the like.

Further, the impact force applied in the direction opposite the direction of arrow A with respect to the cored bar 52 is conveyed from the frame body 66 of the pad 64 to the bracket 56 and is supported as the two edge portions 56A of the bracket 56 abut the crossbars 54B of the bridges (engaging pieces) 54. As a result, the impact force applied in the direction opposite the direction of arrow A is stably and reliably supported by the bridges 54 which are integrally formed with the cored bar 52. Thus, even if the structure of the bracket 56 is not thickened and strengthened, the bracket 56 can bear the load sufficiently. Since the bridges 54, which are integrally formed with the cored bar 52, are used, there is no need to provide a separate supporting metal fitting at the cored bar 52 and an inexpensive product whose structure is simple can be provided.

In the present embodiment, since the bracket 56 which is urged toward the vehicle operator's side is held by abutting the bridge 54 formed at the cored bar 52, the bracket 56 and the structure of holding the springs 80 can be simplified. Moreover, because the bracket 56 is positioned with respect to the axial center of the steering shaft by only using the hole 84A of the bushing 84 integrally formed with the bracket 56 and the pin 86 of the bridge 54 and without using other parts, it is not necessary to use an exclusive bolt or parts attached thereto. As a result, the bracket 56 can be held by the parts having simple structures preventing deviation of the bracket 56 and without hindering the movement thereof. Also, a superior effect is achieved in that, by inserting the bracket 56 between the crossbars 54B of the bridges 54 and the spokes 52C of the cored bar 52, and further, by mounting the pad 64 at the bracket 56, the parts can be assembled in a simple way. Moreover, since an exclusive bolt is not needed and the bridge 54 can be integrally cast with the cored bar 52 of the steering wheel 50, the cost of the steering wheel can be reduced.

Further, in the present embodiment, because the two spokes 52C of the cored bar 52 are connected by the bridge 54, the structure of the cored bar 52 is reinforced and the strength and rigidity of the entire steering wheel 50 can be remarkably improved. Since the cored bar 52 is a die-cast product and can be integrally cast with the leg portions 54A and the pressing portions 54B, the product is inexpensive and easily manufactured.

Furthermore, in the present embodiment, since the frame body 66 is provided at the pad 64 and supported by the supporting plate portions 56B which are formed upright at the bracket 56, the space for allowing movement of pad 64 is secured and the connection between the bracket 56 and the pad 64 can be reliably effected. Because the bracket 56 has a plurality of supporting plate portions 56B and is integrally formed therewith, the number of attaching parts such as springs 80 can be reduced. Moreover, since the supporting plate portions 56B of the bracket 56 are provided at both sides of the pressing portions 54B, and the peripheries of the pressing portions 54B are enclosed by the bracket 56 and the frame body 66 of the pad 64, the impact force generated by operating the air bag apparatus can reliably be supported.

Figure 7A:
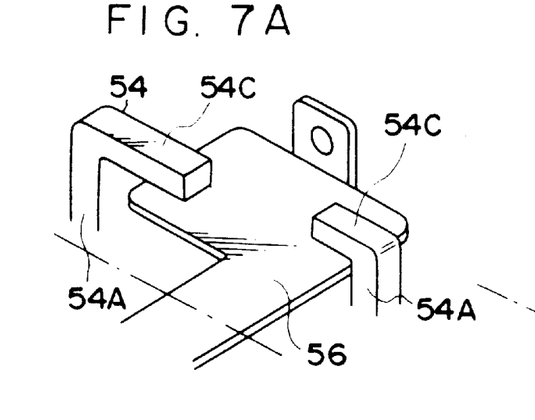
FIG. 7A is a perspective view which shows a variant example of an engaging piece and a bracket.

The present invention is not limited to the above-described structure and various other embodiments can be performed. For example, in the above structure, two bridges 54 are provided, the two upper and lower leg portions 54A of the bridge 54 formed at the spokes 52C of the cored bar 52 are connected by the crossbar 54B of the bridge 54, and the bracket 56 is inserted under the bridges 54. However, the two upper and lower leg portions 54A may not be necessarily connected by the crossbar 54B. As shown in FIG. 7A, the bracket 56 may be held by separate engaging pieces 54 (i.e., the member which is the same as the bridge and is divided in the middle of the crossbar of the bridge), and each of the engaging pieces 54 comprises a leg portion 54A and a pressing portion 54C, which is bent from the distal end of the leg portion 54A to the inner side of the steering wheel 50. Consequently, assembling of the bracket 56 can be simplified.

Figure 7B:
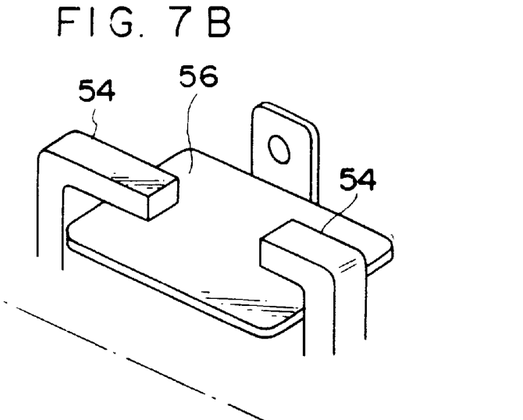
FIG. 7B is a perspective view which shows a variant example of an engaging piece and a bracket.
Figure 7C:
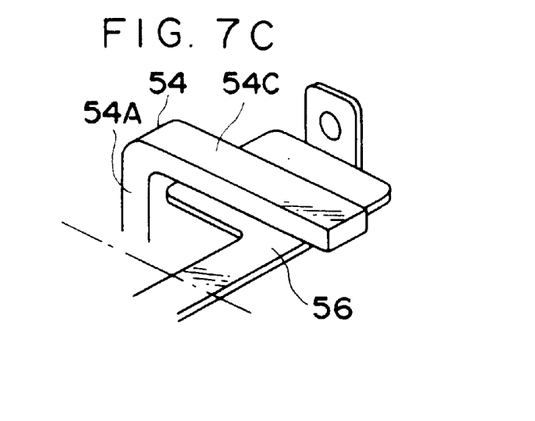
FIG. 7C is a perspective view which shows a variant example of an engaging piece and a bracket.
Figure 7D:
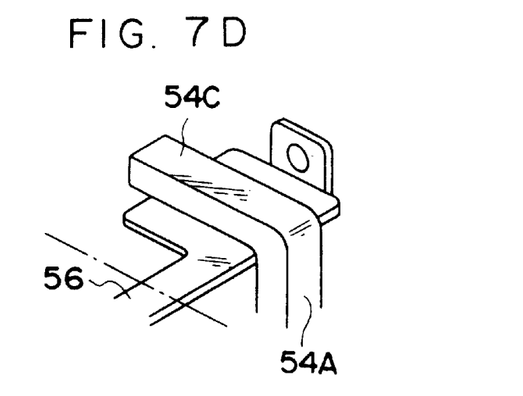
FIG. 7D is a perspective view which shows a variant example of an engaging piece and a bracket.
Figure 7E:
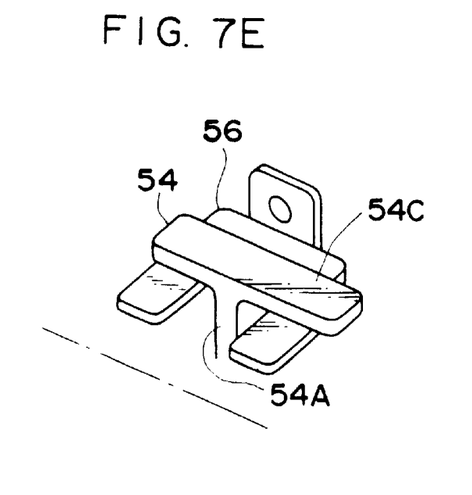
FIG. 7E is a perspective view which shows a variant example of an engaging piece and a bracket.

As illustrated in FIG. 7B, the right side of a bracket 56 may be formed separately from the left side thereof (FIG. 7B shows only one side thereof). Further, as illustrated in FIGS. 7C and 7D, an engaging piece 54 may be formed in the shape of an L in which a pressing portion 54C corresponding to the crossbar of the bridge in FIGS. 2 and 3 is supported by one leg portion 54A. In FIGS. 7C and 7D, only the positions of the leg portions 54A are different and the functions thereof are the same. In this case as well, the right side of the bracket 56 can be formed separately from the left side thereof (not shown). As the right side of the bracket 56 is formed separately from the left side thereof, assembling of the bracket 56 can be simplified. FIG. 7E shows an example in which a leg portion 54A is formed at the center of a pressing portion 54C so that an engaging piece 54 is formed in the shape of a T. In this case, in order to ease the assembly, it is preferable that the two pieces of bracket 56 formed in the shape of a U are used and assembled so as to hold the two engaging pieces 54 from the outer sides thereof.

Figure 7F:
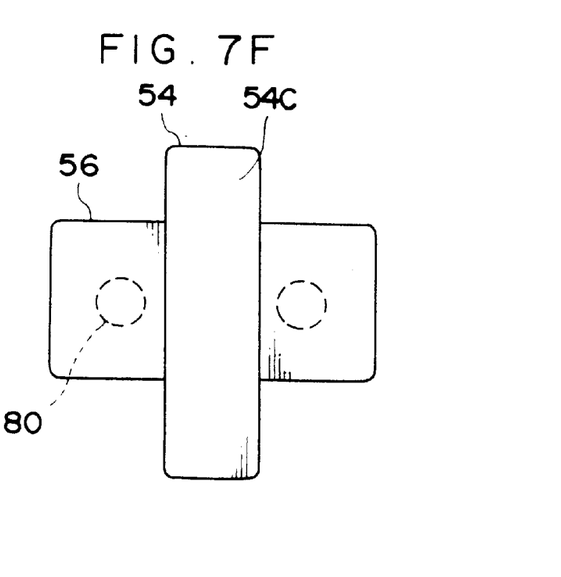
FIG. 7F is a plan view which shows a disposition of a urging means.

As shown in FIGS. 7B and 7E, in a case in which the bracket 56 is divided, as shown in FIG. 7F which is a plan view thereof, it is preferable that urging means such as the compression coil springs 80 are disposed symmetrical with respect to the center line of the pressing portion 54C of the engaging piece 54. Accordingly, the bracket 50 can be pressed well balanced with respect to the pressing portion 54C of the engaging piece 54. In a case in which the bracket 50 is an integrated type as shown in FIGS. 2, 7A, 7C, and 7D, it suffices if the entire bracket 50 is well balanced, and the urging means may be placed at three positions.

Figure 8A:
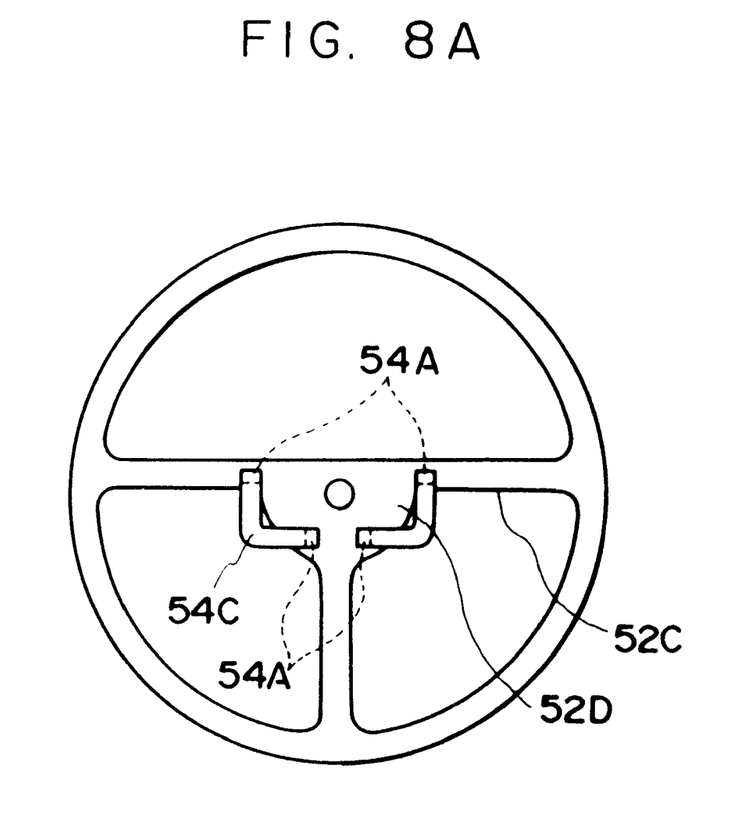
FIG. 8A is an elevational view which shows an example in which a bridge is provided at a three-spoke steering wheel.
Figure 8B:
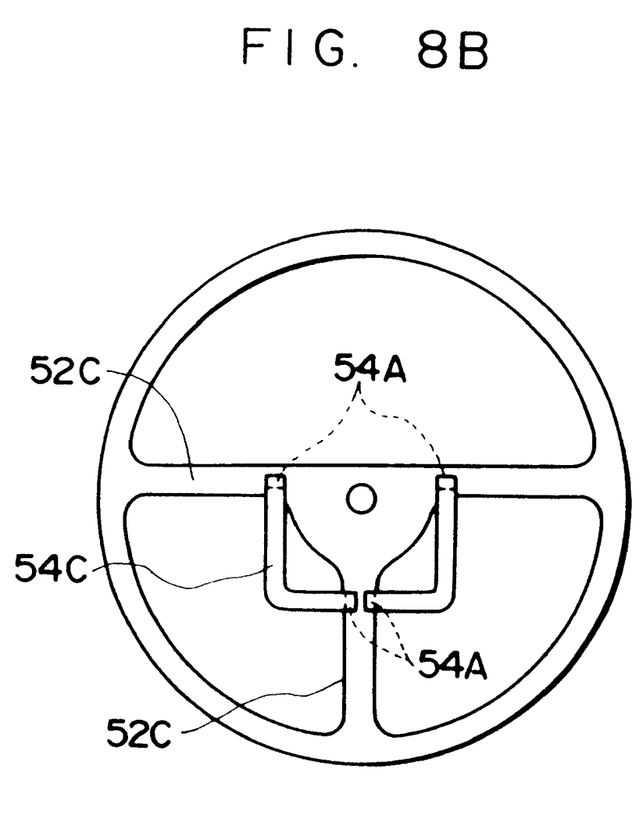
FIG. 8B is an elevational view which shows an example in which a bridge is provided at a three-spoke steering wheel.

The above structures are examples in which the present invention is applied to the steering wheel having four spokes. However, the present invention may be applied to a steering wheel having two or three spokes. Further, the leg portion 54A may be formed at the boss 52A. FIGS. 8A and 8B illustrate examples in which the present invention is applied to a steering wheel having three spokes. In FIG. 8A, leg portions 54A are formed at lateral spokes 52C and a plate boss portion 52D (a planar portion surrounding the boss) and pressing portions 54C are bent. In FIG. 8B, leg portions 54A are formed at a longitudinal spoke 52C and lateral spokes 52C and pressing portions 54C are bent in the same way.

Figure 9A:
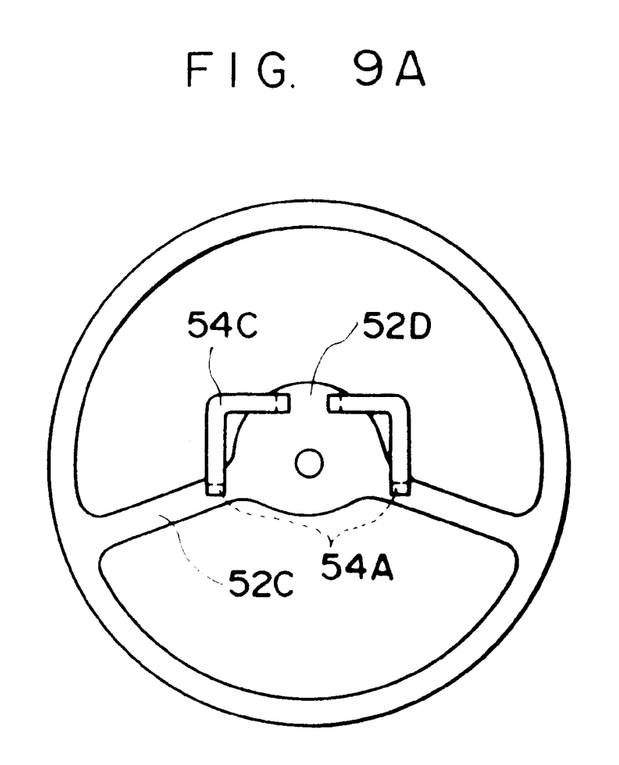
FIGS. 9A is an elevational view which shows an example in which a bridge is provided at a two-spoke steering wheel.
Figure 9B:
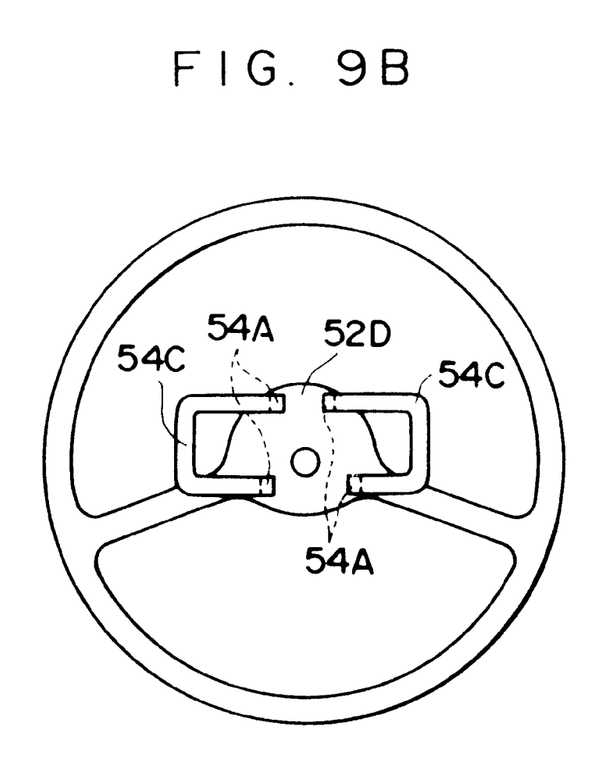
FIGS. 9B is an elevational view which shows an example in which a bridge is provided at a two-spoke steering wheel.

Further, FIGS. 9A and 9B illustrate examples in which the present invention is applied to a steering wheel having two spokes. In FIG. 9A, leg portions 54A are formed at spokes 52C and a plate boss portion 52D and pressing portions 54C are bent. In FIG. 9B, leg portions 54A are formed within a plate boss portion 52D and pressing portions 54A are bent in the form of C. Moreover, although not shown, the engaging piece 54 may be formed separately from the cored bar 52 and attached to the cored bar 52 by using attaching means such as welding or the like. In any of these variant examples, the effects which are the same as those of the examples illustrated in FIGS. 1 to 6 can be obtained.

What is claimed is:

1. A steering wheel in which a center horn is sounded by operating a pad to which an air bag apparatus is attached, comprising:

a steering wheel cored bar which includes a boss which is fixed to a steering shaft, spokes which extend from said boss, an annular wheel rim which is connected to end portions of said spokes, a leg portion extending from a predetermined position at one of said boss and said spokes, and a pressing portion which extends from said leg portion in a direction different from the direction of said leg portion;

a frame body to which said air bag apparatus and a surface cover are attached;

a bracket which is connected to the pad to which the air bag apparatus is attached, said bracket being movably disposed between said boss or said spokes and said pressing portion of said steering wheel cored bar, said bracket being disposed so that, when the air bag apparatus of said pad is operated, impact force which is applied toward a vehicle operator's position is supported as the bracket abuts said pressing portion, said pressing portion guiding and centering the bracket when said pad is operated; and a plurality of supporting portions which are formed upright at said bracket and support said frame body, said supporting portions and said bracket being integrally formed.

2. A steering wheel according to claim 1, wherein said steering wheel cored bar includes a plurality of leg portions and said leg portions are connected by said pressing portion.

3. A steering wheel according to claim 2, wherein said leg portions are connected by said pressing portion between said spokes or between one of said spokes and said boss of said cored bar.

4. A steering wheel according to claim 1, wherein said steering wheel cored bar is a die-cast product in which said leg portion and said pressing portion are integrally formed.

5. A steering wheel according to claim 2, wherein said steering wheel cored bar is a die-cast product in which said leg portions and said pressing portion are integrally formed.

6. A steering wheel according to claim 3, wherein said steering wheel cored bar is a die-cast product in which said leg portions and said pressing portion are integrally formed.

7. A steering wheel according to claim 1, wherein a plurality of said brackets exist, and said frame body is connected to said supporting portions of the plurality of said brackets.

8. A steering wheel according to claim 1, wherein a plurality of supporting portions connected to said frame body exist, and the supporting portions are provided at sides of said pressing portion.

9. A steering wheel according to claim 1, which includes urging members which are disposed between said bracket and said cored bar and which urge said bracket toward the vehicle operator's position.

10. A steering wheel according to claim 2, which includes urging members which are disposed between said bracket and said cored bar and which urge said bracket toward the vehicle operator's position.

11. A steering wheel according to claim 1, wherein a pin which projects in a moving direction of said bracket is provided at the cored bar side of said pressing portion, and a through-hole through which said pin can be inserted is provided at said bracket.

12. A steering wheel according to claim 2, wherein a pin which projects in a moving direction of said bracket is provided at the cored bar side of said pressing portion, and a through-hole through which said pin can be inserted is provided at said bracket.

* * * * *